US010773668B1

(12) United States Patent
Vejalla et al.

(10) Patent No.: US 10,773,668 B1
(45) Date of Patent: Sep. 15, 2020

(54) VEHICLE POWER NETWORK

(71) Applicant: Ford Global Technologies, LLC, Dearborn, MI (US)

(72) Inventors: Dhanunjay Vejalla, Novi, MI (US); Tsung-Han Tsai, Ypsilanti, MI (US); Michael Adel Awad Alla, Novi, MI (US); David A. Symanow, Plymouth, MI (US); Ray C. Siciak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 13 days.

(21) Appl. No.: 16/408,660

(22) Filed: May 10, 2019

(51) Int. Cl.
| | | |
|---|---|---|
| *H02J 1/00* | (2006.01) | |
| *H02J 3/00* | (2006.01) | |
| *H02J 9/06* | (2006.01) | |
| *B60R 16/02* | (2006.01) | |
| *B60R 16/03* | (2006.01) | |
| *B60L 55/00* | (2019.01) | |
| *G06F 3/147* | (2006.01) | |

(52) U.S. Cl.
CPC .......... *B60R 16/0315* (2013.01); *B60L 55/00* (2019.02); *G06F 3/147* (2013.01)

(58) Field of Classification Search
CPC .... H02J 1/084; H02J 1/086; H02J 1/10; H02J 3/005; H02J 3/007; H02J 9/00; H02J 9/007; H02J 9/06; H02J 13/00001; B60R 16/0232; B60L 58/18; B60L 58/19
See application file for complete search history.

(56) References Cited

U.S. PATENT DOCUMENTS

| | | | |
|---|---|---|---|
| 5,859,628 A | 1/1999 | Ross et al. | |
| 6,465,908 B1 * | 10/2002 | Karuppana | ............. B60R 16/03 307/31 |
| 10,005,562 B2 | 6/2018 | Kneuper | |
| 10,164,464 B1 * | 12/2018 | Ross | ......................... G06F 1/30 |
| 10,459,504 B2 * | 10/2019 | Veloso | .................. G06F 3/0488 |
| 2017/0285712 A1 | 10/2017 | Veloso et al. | |

FOREIGN PATENT DOCUMENTS

| | | |
|---|---|---|
| CN | 104104807 | 6/2017 |
| CN | 206819541 U | 12/2017 |

* cited by examiner

*Primary Examiner* — An T Luu
(74) *Attorney, Agent, or Firm* — Frank A. MacKenzie; Bejin Bieneman PLC

(57) ABSTRACT

A computer includes a processor and a memory, the memory storing instructions executable by the processor to identify a failure in one of a first, second, or third vehicle power networks and to instruct one of a first display controller connected to the first vehicle power network or a second display controller connected to the second vehicle power network to provide a message to displays respectively connected to the first vehicle power network or the second vehicle power network.

20 Claims, 3 Drawing Sheets

VEHICLE POWER NETWORK

BACKGROUND

Power networks in vehicles provide electricity from power sources to components. For example, a battery can supply power to a human-machine interface (HMI) display on which a display controller can provide a message, such as an identification of a fault, to a vehicle occupant. Upon failure of one of the power networks, one or more components connected to the failed power network can fail to operate properly or at all.

DETAILED DESCRIPTION

Figure 1:
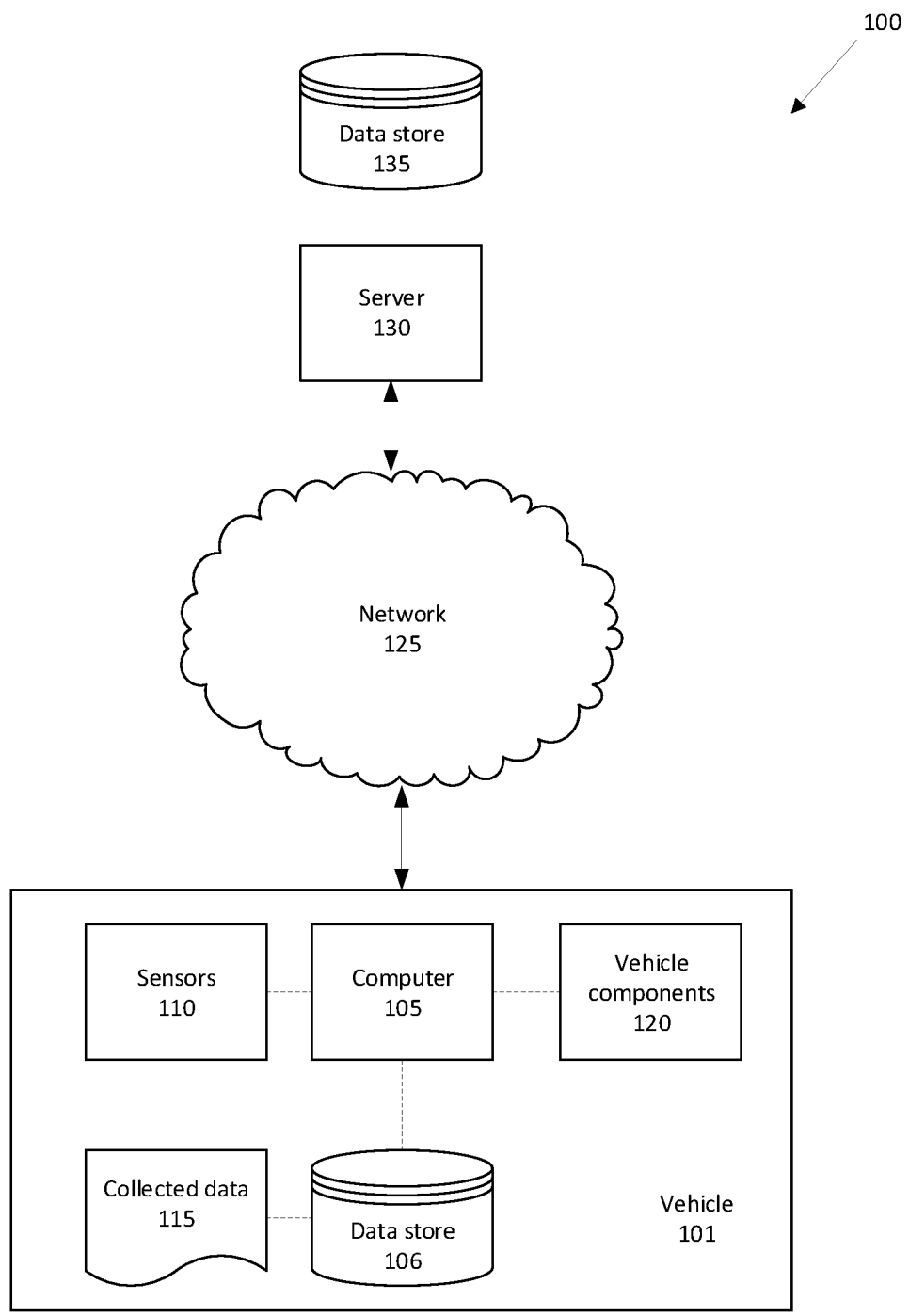
FIG. 1 is a block diagram of an example system for managing power failures in a vehicle.

A system includes a plurality of vehicle power networks including a first vehicle power network, a second vehicle power network, and a third vehicle power network, a plurality of first displays, each first display connectable to one of the first, second, or third vehicle power networks; and a plurality of second displays, each second display connectable to one of the first, second, or third vehicle power networks. At least one first display is connected to a different vehicle power network than another of the first displays. At least one of the second displays is connected a different one of the vehicle power networks than another of the second displays. Each of the first, second, and third power vehicle networks is connected to at least one of the first displays or one of the second displays.

The first and second vehicle power networks can be connected to one of a brake or a steering component and the third vehicle power network can be connected to a propulsion.

The system can further include a first display controller connected to the first vehicle power network and a second display controller connected to the second vehicle power network.

The first display controller can be connected to at least one of the first displays and at least one of the second displays, and the second display controller can be connected to at least one of the first displays and at least one of the second displays.

The first display controller and the second display controller can be respectively programmed to provide a message to at least one of the first or second displays.

The the first display controller can be programmed to display a message upon failure of the second display controller and the second display controller can be programmed to display a message upon failure of the first display controller.

The first controller and the second controller can be respectively programmed to, upon detection of a failure of the third vehicle power network, display a message indicating a deactivation of a propulsion.

The first display controller and the second display controller can be each programmed to provide a message indicating a risk condition upon failure of at least one of the first, second, or third vehicle power networks.

The system can further include a computer including a processor and a memory, the memory storing instructions executable by the processor to identify a failure in one of the first, second, or third vehicle power networks and to instruct one of a first display controller or a second display controller to provide a message on the displays connected to the first vehicle power network or the second vehicle power network.

The first plurality of displays can be disposed facing a first row of vehicle seats and the second plurality of displays can be disposed facing a second row of vehicle seats.

The system can further include a first display controller connected to at least one of the displays facing the first row of seats and at least one of the displays facing the second row of seats and a second display controller connected to at least one of the displays facing the first row of seats and at least one of the displays facing the second row of seats.

Each of the first, second, and third vehicle power networks can be connected to a respective first, second, and third battery.

The first vehicle power network and the second vehicle power network can be redundant power networks of a driving controller of a vehicle.

The driving controller can be programmed to, upon detecting a failure of the third vehicle power network, actuate a steering component to steer the vehicle out of a roadway.

A system, comprising a computer including a processor and a memory, the memory storing instructions executable by the processor to identify a failure in one of a first, second, or third vehicle power networks and to instruct one of a first display controller connected to the first vehicle power network or a second display controller connected to the second vehicle power network to provide a message to displays respectively connected to the first vehicle power network or the second vehicle power network.

The instructions can further include instructions to, upon identifying a failure in the third vehicle power network, instruct the first display controller and the second display controller to provide a message to first and second displays respectively connected to the first vehicle power network and the second vehicle power network.

The instructions can further include instructions to, upon identifying the failure, determine a risk condition and to instruct one of the first display controller or the second display controller to provide a message indicating the risk condition.

At least one of the displays can be connected to the first display controller and one of the second vehicle power network or the third vehicle power network.

At least one of the displays can be connected to the first display controller and the first vehicle power network and another of the displays can be connected to the first display controller and the second vehicle power network.

The first display controller can be connected to a first display facing a first seat and the second display controller is connected to a second display facing a second seat, the first seat and the second seat disposed in a same row of seats in a vehicle.

A method includes identifying a failure in one of a first, second, or third vehicle power networks and instructing one of a first display controller connected to the first vehicle power network or a second display controller connected to the second vehicle power network to provide a message to displays respectively connected to the first vehicle power network or the second vehicle power network.

The method can further include, upon identifying the failure, determining a risk condition and instructing one of the first display controller or the second display controller to provide a message indicating the risk condition.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Redundant power networks for vehicle components allow the components to remain functional when one of the power networks fails, e.g., shorts to ground. Connecting displays in a vehicle to one of three power networks allows a vehicle computer to display messages on the displays when one of the power networks fails. Because the likelihood of all three power networks failing is unlikely, the computer can mitigate the power failure of one of the power networks while informing occupants in the vehicle of the mitigation countermeasures on the displays. When the computer includes two display controllers, each connected to a different power network, the display controllers can provide messages to at least one display when one of the power networks fails, even if the failed power network is connected to one of the display controllers. The displays can be arranged between a plurality of rows of vehicle seats, and the displays can be connected to the power networks such that, upon failure of any one of the power networks, at least one display in each row is connected to one of the functional power networks to display messages to occupants.

FIG. 1 illustrates an example system 100 for managing power failures in a vehicle 101. The system 100 includes a computer 105. The computer 105, typically included in the vehicle 101, is programmed to receive collected data 115 from one or more sensors 110. For example, vehicle 101 data 115 may include a location of the vehicle 101, data about an environment around a vehicle 101, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

When the computer 105 partially or fully operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle propulsion, braking, and steering are controlled by the computer 105. A semi-autonomous mode is one in which at least one of vehicle propulsion, braking, and steering are controlled at least partly by the computer 105 as opposed to a human operator. In a non-autonomous mode, i.e., a manual mode, the vehicle propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
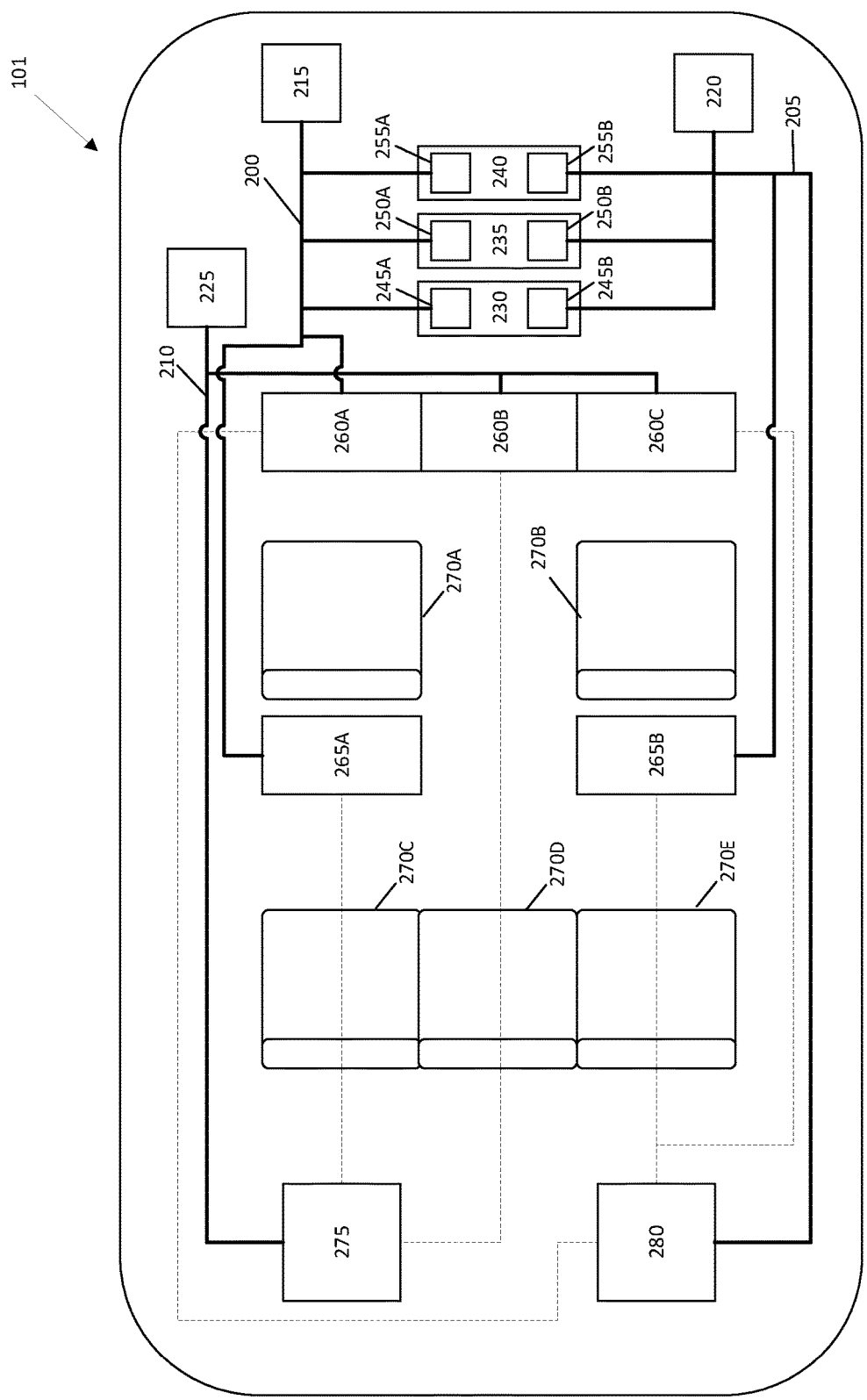
FIG. 2 is a diagram of power networks in the vehicle.

FIG. 2 is a diagram of the vehicle 101. The vehicle 101 includes a first power network 200, a second power network 205, and a third power network 210 (collectively, power networks 200, 205, 210). The power networks 200, 205, 210 provide electricity to components 120 and other portions of the vehicle 101. The power networks 200, 205, 210 include wires and/or busses that transmit or conduct the electricity to the components 120.

Each power network 200, 205, 210 is connected to a respective battery 215, 220, 225. That is, the first power network 200 is connected to a first battery 215, the second power network 205 is connected to a second battery 220, and the third power network 210 is connected to a third battery 225. The batteries 215, 220, 225 supply electricity to their respective power networks 200, 205, 210 and thus supply electricity to the components 120. The batteries 215, 220, 225 can be, e.g., lead-acid batteries, lithium-ion batteries, etc. Each power network 200, 205, 210 can provide, e.g., 200 amperes of electricity to components 120 of the vehicle 101.

Each of the power networks 200, 205, 210 can fail, i.e., stop providing electricity from respective batteries 215, 220, 225 to the components 120. For example, the power networks 200, 205, 210 can fail by short-circuiting to ground. In another example, the power networks 200, 205, 210 can fail when a wire of the power networks 200, 205, 210 is damaged. The computer 105 can identify the failure by, e.g., requesting acknowledgment from components 120 that the components 120 are receiving power, and if the computer 105 does not receive acknowledgment, the computer 105 can determine that the power network 200, 205, 210 to which the components 120 are connected has failed. Alternatively, the computer 105 can identify the failure with conventional fault detection techniques, e.g., detecting changes in discharge patterns, detecting an increase in a current, etc. Upon failure of one of the power networks 200, 205, 210, components 120 connected to the failed power network 200, 205, 210 can stop operating if the components 120 do not have a redundant source of power. The computer 105 can determine to take countermeasures upon detecting a failure of one of the power networks 200, 205, 210, e.g., move the vehicle 101 to a side of a roadway, move the vehicle 101 to a parking lot, move the vehicle 101 to a repair shop, etc.

The first power network 200 and the second power network 205 can provide power to one or more controllers (i.e., computing devices with processors and memories), e.g., a driving controller 230, a steering controller 235, and/or a brake controller 240. Because both the first power network 200 and the second power network 205 provide power to the driving controller 230, the steering controller 235, and the brake controller 240, the first power network 200 and the second power network 205 can be redundant power sources. That is, if one of the first power network 200 or the second power network 205 fail, the other power network 200, 205 can supply power to the controllers 230, 235, 240. Upon failure of one of the power networks 200, 205, the computer 105 can determine that the controllers 230, 235, 240 no longer have a redundant power source and take countermeasures, e.g., move the vehicle 101 to the side of the roadway.

The driving controller 230 can be programmed to operate the vehicle 101 in the autonomous or semi-autonomous modes. For example, the driving controller can be programmed with conventional Advanced Driver Assistance System operations, including, e.g., navigation, acceleration, braking, and/or steering of the vehicle 101. The driving controller 230 can include electronic control units (ECUs) 245A, 245B. The ECU 245A can be connected to the first power network 200. The ECU 245B can be connected to the second power network 205. The computer 105 can instruct the ECUs 245A, 245B to actuate one or more components, e.g., a throttle of a propulsion 120, a navigation component, etc., to operate the vehicle 101 in the autonomous or semi-autonomous modes. Upon failure of one of the first power network 200 or the second power network 205, the respective ECU 245A, 245B connected to the failed power network 200, 205 can no longer receive electricity, and the other ECU 245A, 245B on the remaining power network 200, 205 can operate the vehicle 101 in the autonomous or semi-autonomous modes. That is, the ECUs 245A, 245B are redundant so that the driving controller 230 can operate the vehicle 101 when one of the power networks 200, 205 fail.

The steering controller 235 can include ECUs 250A, 250B. The ECU 250A can be connected to the first power network 200. The ECU 250B can be connected to the second power network 205. The computer 105 can instruct the ECUs 250A, 250B to actuate one or more parts of a steering component 120, e.g., a steering assist motor. The ECUs 250A, 250B are redundant so that the steering controller 235 can operate the steering component 120 when one of the power networks 200, 205 fail.

The brake controller 240 can include ECUs 255A, 255B. The ECU 255A can be connected to the first power network 200. The ECU 255B can be connected to the second power network 205. The computer 105 can instruct the ECUs 255A, 255B to actuate one or more parts of a brake 120, e.g., a brake fluid pump. The ECUs 255A, 255B are redundant so that the brake controller 240 can operate the brake component 120 when one of the power networks 200, 205 fail.

The third power network 210 can provide electricity to one or more components 120 in the vehicle 101. For example, the third power network 210 can provide electricity to a propulsion 120. The first power network 200 and the second power network 205 can be redundant power sources for the controllers 230, 235, 240, and the third power network 210 can be a base power network for the components 120. Thus, when the third power network 210 fails, one or more components 120 can deactivate from lack of electricity, e.g., a propulsion 120.

The vehicle 101 includes a plurality of first displays 260A, 260B, 260C (collectively, first displays 260) and a plurality of second displays 265A, 265B (collectively, second displays 265). The first displays 260 are disposed in a first row in a passenger cabin of the vehicle 101. The second displays 265 are disposed in a second row in the passenger cabin of the vehicle 101. Each of the first displays 260 and the second displays 265 is connected to one of the power networks 200, 205, 210. The displays 260, 265 can be human-machine interface (HMI) displays that provide information on a screen, e.g., a visual message.

The first displays 260 and the second displays 265 face seats 270. That is, each seat 270 can face one of the first displays 260 or one of the second displays 265. The example of FIG. 2 shows five seats 270A, 270B, 270C, 270D, 270E. The seats 270A, 270B can be a first row of seats 270. The first display 260A can face the seat 270A. The first display 260C can face the seat 270B. the seats 270C, 270D, 270E can be a second row of seats 270. The second display 265A can face the seat 270C. The first display 260B can face the seat 270D. The second display 265B can face the seat 270E.

The vehicle 101 includes a first display controller 275 and a second display controller 280. The first display controller 275 receives instructions from the computer 105 over the network 125 and displays messages to at least one of the first displays 260 and at least one of the second displays 265. The second display controller 280 receives instructions from the computer 105 over the network 125 and sends messages to at least one of the first displays 260 and at least one of the second displays 265. In the example of FIG. 2, the dashed lines represent the connections between the display controllers 275, 280 and the displays 260, 265. For example, as shown in FIG. 2, the first display controller 275 can send messages to the first displays 260A, 260B and the second display 265A, and the second display controller 280 can send messages to the first display 260C and the second display 265B. That is, each row of seats 270 includes seats 270 that face at least one display 260, 265 connected to the first display controller 275 and at least one display 260, 265 connected to the second display controller 275. Thus, if one of the power networks 200, 205, 210 fails, at least one display controller 275, 280 can provide messages to at least one first display 260 and at least one second display 265. The first display controller 275 and the second display controller 280 can be Accessory Protocol Interface Modules (APIMs) or the like that send messages to the first displays 260 and the second displays 265.

The computer 105 can identify a risk condition. In the present context, a "risk condition" is a measure of a severity of a fault in the vehicle 101. For example, a fault in a propulsion 120 can have a higher risk condition than a fault in a windshield wiper. The risk condition can have an alphanumeric code, e.g., 1, 2, 3, etc., indicating the severity of the risk condition. For example, a risk condition of "3" can be more severe than a risk condition of "1." The computer 105 can identify the risk condition based on diagnostic data 115 from the components 120 indicating faults in the components 120. Upon determining the risk condition, the computer 105 can actuate one or more components 120 to address the failed components 120. For example, for a risk condition of 1, the computer 105 can identify a parking location with a navigation component and actuate the steering component 120 and the brake 120 to move to the parking location. As another example, for a risk condition of 2, the computer 105 can actuate a steering component 120 and a brake 120 to move the vehicle 101 to a side of a roadway. In another example, for a risk condition of 3, the computer 105 can apply a brake 120 to stop the vehicle 101 in a current roadway lane. When one of the power networks 200, 205, 210 fail, components 120 connected to the failed power network 200, 205, 210 can fail. The computer 105 can identify a fault for each of the failed components 120 and a risk condition for each fault. For example, the data store 106 can include a lookup table that lists risk conditions associated with faults in specific components 120, such as Table 1 below. The computer 105 can match the fault from the identified component 120 to the risk condition associated with the fault for the identified component.

TABLE 1

| Faulted Component | Risk Condition |
| --- | --- |
| One of driving controller ECUs 245A, 245B | 1 |
| Both ECUs 245A, 245B | 3 |
| One of steering controller ECUs 250A, 250B | 1 |
| Both ECUs 250A, 250B | 3 |
| One of brake controller ECUs 255A, 255B | 1 |
| Both ECUs 255A, 255B | 3 |
| Propulsion | 2 |

The computer 105 can instruct the first display controller 275 and/or the second display controller 280 to display a message to the first displays 260 and the second displays 265 indicating the fault associated with the risk condition. The computer 105 can include messages stored in the data store 106 associated with each risk condition, e.g., text describing the risk condition, audio cues to direct users to the displays 260, 265, etc. The computer 105 can be programmed to, upon identifying the risk condition, search the data store 106 for the associated message and to instruct the display controllers 275, 280 to provide the message to the displays 260, 265. The display controllers 275, 280 can instruct the display 260, 265 to display a message that includes text describing the risk condition and one or more actions that the computer 105 performs to address the fault associated with the risk condition. For example, the message can include text describing that the computer 105 is steering the vehicle 101 to a side of the roadway upon failure of the third power network 210 which provided power to the propulsion 120. The message can further state that the propulsion 120 has been deactivated upon failure of the third power network 210.

Upon failure of one of the power networks 200, 205, 210, the computer 105 can determine the risk condition, actuate components 120 to address or manage the power failure, and instruct the display controllers 275, 280 to display the message on the displays 260, 265. For example, upon failure of the third power network 210, the propulsion 120, the first display controller 275, and the first displays 260B, 260C can deactivate from lack of electricity. The computer 105 can instruct the steering controller 235 to steer the vehicle 101 to the side of the roadway and instruct the second display controller 280 to provide a message indicating a risk condition of 3B to the first display 260A and the second displays 265A, 265B. The message can further include that the propulsion 120 has been deactivated and that the computer 105 is steering the vehicle 101 to the side of the roadway.

Figure 3:
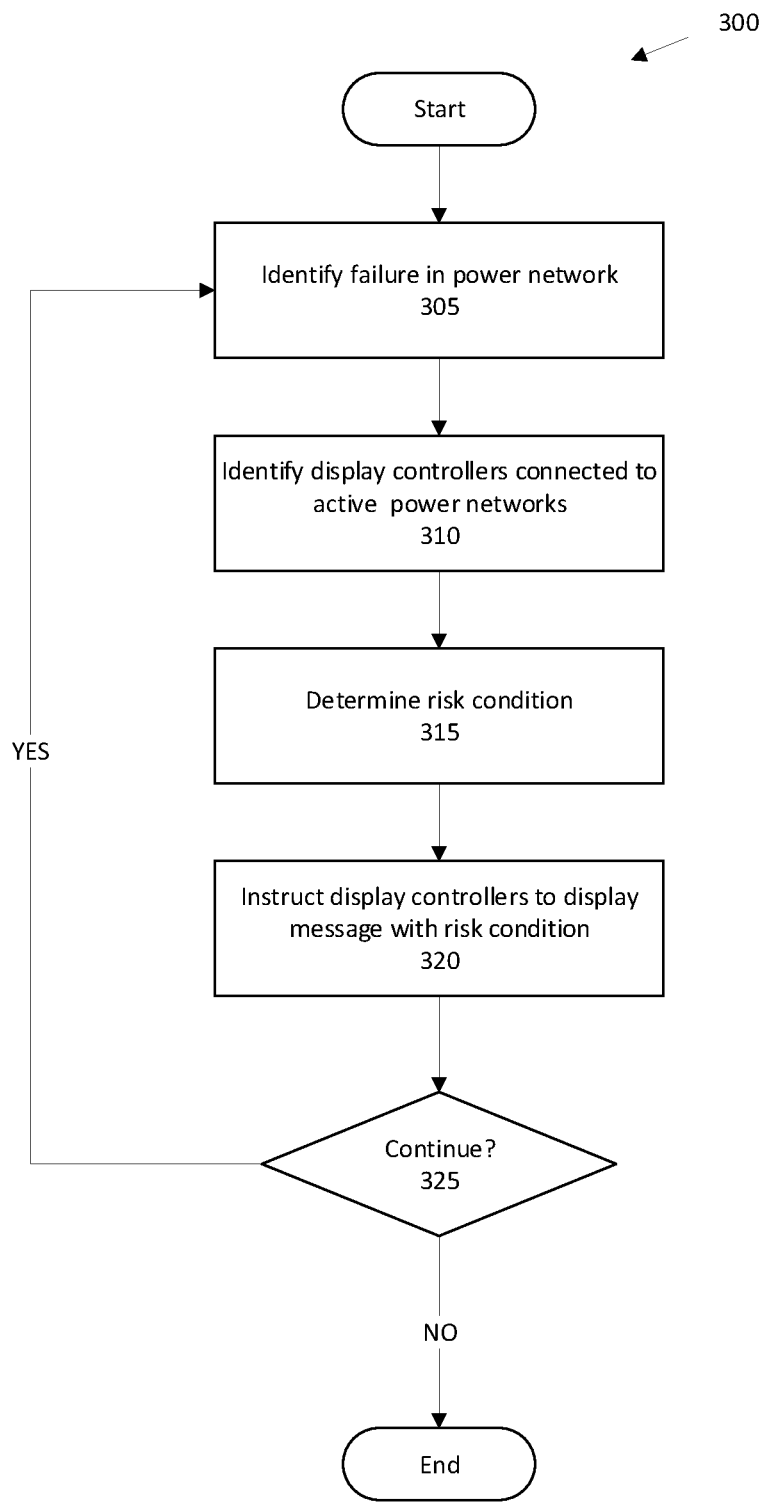
FIG. 3 is a block diagram of an example process for managing power failures in the vehicle.

FIG. 3 is a block diagram of an example process 300 for managing power failures in a vehicle 101. The process 300 begins in a block 305, in which the computer 105 identifies a failure in one of a first power network 200, a second power network 205, or a third power network 210. For example, one of the power networks 200, 205, 210 can short to ground, preventing electricity transfer to components 120 connected to the respective power network 200, 205, 210. The computer 105 can identify the failure by, e.g., requesting acknowledgment from components 120 that the components 120 are receiving power, and if the computer 105 does not receive acknowledgment, the computer 105 can determine that the power network 200, 205, 210 to which the components 120 are connected has failed. In another example, the computer 105 can identify the failure with a conventional fault-detection technique, e.g., detecting changes in discharge patterns in the power networks 200, 205, 210, detecting an increase in a current, etc.

Next, in a block 310, the computer 105 identifies display controllers 275, 280 that are connected to active power networks 200, 205, 210. That is, the computer 105 identifies display controllers 275, 280 that are connected to one or ones of the power networks 200, 205, 210 that did not fail. For example, if the first power network 200 fails, the computer 105 can identify the second display controller 280 that is connected to the second power network 205.

Next, in a block 315, the computer 105 determines a risk condition. As described above, the risk condition is a measure of a severity of a fault of one or more components 120 resulting from the failed power network 200, 205, 210. The computer 105 can determine the risk condition for each fault associated with each failed component 120. As described above, the risk condition can have an alphanumeric code, e.g., 1, 2, 3, etc., indicating the severity of the risk condition. For example, a risk condition of "3" can be more severe than a risk condition of "1." The computer 105 can assign an alphanumeric code to each fault.

Next, in a block 320, the computer 105 instructs the identified display controllers 275, 280 to display a message on at least one first display 260 and at least one second display 265 indicating the fault associated with the risk condition. The message can include, e.g., an identification of the failed component 120, an action that the computer 105 performs to mitigate the failed component 120 (e.g., steering the vehicle 101 to a side of a roadway), the alphanumeric code indicating the severity of the fault, etc.

Next, in a block 325, the computer 105 determines whether to continue the process 300. For example, the computer 105 can determine not to continue the process 300 when the computer 105 moves the vehicle 101 to the side of the roadway and stops the vehicle 101. If the computer 105 determines to continue, the process 300 returns to the block 305. Otherwise, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The adjectives "first," "second," and "third" are used throughout this document as identifiers and are not intended to signify importance or order.

What is claimed is:

1. A system, comprising:
a plurality of vehicle power networks including a first vehicle power network, a second vehicle power network, and a third vehicle power network;
a plurality of first displays, each first display connectable to one of the first, second, or third vehicle power networks; and
a plurality of second displays, each second display connectable to one of the first, second, or third vehicle power networks;
wherein at least one first display is connected to a different vehicle power network than another of the first displays;
wherein at least one of the second displays is connected to a different one of the vehicle power networks than another of the second displays;
wherein each of the first, second, and third power vehicle networks is connected to at least one of the first displays or one of the second displays.

2. The system of claim 1, wherein the first and second vehicle power networks are connected to one of a brake or a steering component and the third vehicle power network is connected to a propulsion.

3. The system of claim 1, further comprising a first display controller connected to the first vehicle power network and a second display controller connected to the second vehicle power network.

4. The system of claim 3, wherein the first display controller is connected to at least one of the first displays and at least one of the second displays, and the second display controller is connected to at least one of the first displays and at least one of the second displays.

5. The system of claim 4, wherein the first display controller and the second display controller are respectively programmed to provide a message to at least one of the first or second displays.

6. The system of claim 5, wherein the first display controller is programmed to display a message upon failure of the second display controller and the second display controller is programmed to display a message upon failure of the first display controller.

7. The system of claim 3, wherein the first controller and the second controller are respectively programmed to, upon detection of a failure of the third vehicle power network, display a message indicating a deactivation of a propulsion.

8. The system of claim 3, wherein the first display controller and the second display controller are each programmed to provide a message indicating a risk condition upon failure of at least one of the first, second, or third vehicle power networks.

9. The system of claim 1, further comprising a computer including a processor and a memory, the memory storing instructions executable by the processor to:
identify a failure in one of the first, second, or third vehicle power networks; and
instruct one of a first display controller or a second display controller to provide a message on the displays connected to the first vehicle power network or the second vehicle power network.

10. The system of claim 1, wherein the first plurality of displays is disposed facing a first row of vehicle seats and the second plurality of displays is disposed facing a second row of vehicle seats.

11. The system of claim 10, further comprising:
a first display controller connected to at least one of the displays facing the first row of seats and at least one of the displays facing the second row of seats; and
a second display controller connected to at least one of the displays facing the first row of seats and at least one of the displays facing the second row of seats.

12. The system of claim 1, wherein each of the first, second, and third vehicle power networks is connected to a respective first, second, and third battery.

13. The system of claim 1, wherein the first vehicle power network and the second vehicle power network are redundant power networks of a driving controller of a vehicle.

14. The system of claim 13, wherein the driving controller is programmed to, upon detecting a failure of the third vehicle power network, actuate a steering component to steer the vehicle out of a roadway.

15. A system, comprising a computer including a processor and a memory, the memory storing instructions executable by the processor to:
identify a failure in one of a first, second, or third vehicle power networks; and
instruct one of a first display controller connected to the first vehicle power network or a second display controller connected to the second vehicle power network to provide a message to displays respectively connected to the first vehicle power network or the second vehicle power network.

16. The system of claim 15, wherein the instructions further include instructions to, upon identifying a failure in the third vehicle power network, instruct the first display controller and the second display controller to provide a message to first and second displays respectively connected to the first vehicle power network and the second vehicle power network.

17. The system of claim 15, wherein the instructions further include instructions to, upon identifying the failure, determine a risk condition and instruct one of the first display controller or the second display controller to provide a message indicating the risk condition.

18. The system of claim 15, wherein at least one of the displays is connected to the first display controller and one of the second vehicle power network or the third vehicle power network.

19. The system of claim 15, wherein at least one of the displays is connected to the first display controller and the first vehicle power network and another of the displays is connected to the first display controller and the second vehicle power network.

20. The system of claim 15, wherein the first display controller is connected to a first display facing a first seat and the second display controller is connected to a second display facing a second seat, the first seat and the second seat disposed in a same row of seats in a vehicle.

* * * * *